United States Patent [19]

Stephenson

[11] 4,343,488

[45] Aug. 10, 1982

[54] SEAT BELT SYSTEM WITH REDUCED SPOOLING

[75] Inventor: Robert L. Stephenson, Sterling Heights, Mich.

[73] Assignee: Allied Corporation, Morris Township, Morris County, N.J.

[21] Appl. No.: 91,641

[22] Filed: Nov. 5, 1979

[51] Int. Cl.³ ............................................. B60R 21/10
[52] U.S. Cl. ................................... 280/802; 280/807; 242/107.4 C
[58] Field of Search ............... 280/801, 802, 803, 804, 280/807; 242/107.2, 107.3, 107.4 A, 107.4 C

[56] References Cited

U.S. PATENT DOCUMENTS

| | | | |
|---|---|---|---|
| 3,851,837 | 12/1974 | Griffin | 242/107.4 A |
| 4,120,466 | 10/1978 | Adomeit | 280/806 |
| 4,163,530 | 8/1979 | Kondo | 242/107.2 |
| 4,164,336 | 8/1979 | Higbee | 280/806 |
| 4,185,791 | 1/1980 | Takada | 242/107.2 |
| 4,195,795 | 4/1980 | Ardizio | 242/107.4 A |
| 4,211,377 | 7/1980 | Yasumatsu | 242/107.2 |

Primary Examiner—John P. Silverstrim
Attorney, Agent, or Firm—Roger H. Criss

[57] ABSTRACT

A seat belt restraint system including a seat belt retractor for mounting in a vehicle, webbing stored on the retractor, a mechanism for transferring loads acting on the retractor in an emergency situation to a load-bearing part of the vehicle and a clamp associated on the load transfer mechanism which contacts the roll of webbing stored on the retractor subsequent to relative motion between the clamp and the retractor as a result of forces acting on the retractor during the emergency. The system may be a passive seat belt system.

19 Claims, 4 Drawing Figures

4,343,488

SEAT BELT SYSTEM WITH REDUCED SPOOLING

BACKGROUND OF THE INVENTION

1. Field of the Invention

This invention relates to seat belt systems employing seat belt retractors.

2. Description of the Prior Art

One type of seat belt system that has been extensively utilized is a system which includes a single emergency locking retractor which is mounted to the frame of a vehicle, such as on the "B" pillar. A single length of webbing may extend from the retractor in a continuous loop in order to provide lap and shoulder length portions. Another type of system that has been proposed especially with passive seat belt systems is one in which a retractor is mounted to the vehicle frame, such as the floor, inboard of the vehicle seat. During a collision, in such systems the force of the occupant moving against the belts is transferred to and absorbed by the vehicle frame via the retractor and/or buckle mountings. One problem with such systems is that considerable friction is typically experienced in the seat belt webbing extending over a variety of brackets which results in a larger force that is necessary to extend the webbing about the occupant as well as necessitating a stronger rewind spring to completely wind up the webbing.

It has been proposed to mount seat belt retractors directly onto vehicle seats, especially in passive seat belt systems, to provide for reduced friction in the system. Since the seats are adjustable, various means have been suggested to transfer the forces acting on the retractor in an accident to the vehicle frame. Such means should be flexible and adjustable to provide for different positions of the seat. It has been found, however, that even with such load transfer means, emergency locking seat belt retractors mounted on the vehicle seats may pay out excessive amounts of webbing in an impact situation, even though the retractor shaft is locked against rotation in the extraction direction, due to the so called spooling effect. That is, as the occupant exerts force against the webbing, the convolutions of webbing on the retractor spool tighten up and therefore make available an additional amount of webbing for further extraction prior to arresting further forward motion of the occupant. This spooling effect is also experienced with active seat belt systems but is more pronounced with passive seat belt systems since considerably more webbing is wrapped on the retractor spool when the belts are positioned about the occupant than in an active system.

It would be desirable if a seat belt system were provided which effectively transferred impact loads to the vehicle structure with limited spooling of the webbing on the retractor.

SUMMARY OF THE INVENTION

In accordance with this invention, there is provided a seat belt restraint system for installation in the vehicle, the system comprising:

seat belt retractor means adapted for mounting in the vehicle;

seat belt webbing stored on the retractor means and adapted to be extracted from and rewound onto the retractor means;

load transfer means for transferring forces acting on the retractor means to a load-bearing part of the vehicle; and clamp means operatively associated with the load transfer means and adapted for contact with the webbing on the retractor means upon relative motion between the clamp means and the retractor means resulting from forces acting on the retractor means, whereby extraction of the webbing from the retractor means is prevented.

The invention further comprises a seat belt restraint system for installation in a vehicle comprising the aforesaid seat belt retractor means, seat belt webbing and load transfer means, and additionally comprising sensing means actuable to sense an emergency condition of the vehicle; and clamp means operatively associated with the load transfer means and adapted for contact with the webbing on the retractor means upon relative motion between the clamping means and the retractor means following actuation of the sensing means, whereby extraction of the webbing from the retractor means is prevented.

The present invention additionally comprises a seat belt restraint system for installation in a vehicle, comprising the aforesaid seat belt retractor means, seat belt webbing and load transfer means, and further comprising locking means actuable to lock the retractor means in response to an emergency condition of the vehicle; and clamp means operatively associated with the load transfer means and adapted for contact with the webbing on the retractor means upon relative motion between the clamp means and the retractor means following actuation of the locking means, whereby extraction of the webbing from the retractor means is prevented and the forces acting on the retractor means are transferred to the vehicle.

The present invention is particularly applicable to passive seat belt systems in which the retractor is mounted on the vehicle seat and the retractor moves relative to the clamp means as a result of forces acting on the retractor following an impact, and further wherein the clamp means is connected to a separate retractor mechanism for permitting movement of the clamp means together with movement of the seat, as more particularly described below.

The present invention thus provides a means for eliminating or reducing the spooling effect in a seat belt retractor while at the same time permitting transferring of forces acting on the retractor to a structural part of the vehicle.

DESCRIPTION OF THE PREFERRED EMBODIMENTS

Figure 1:
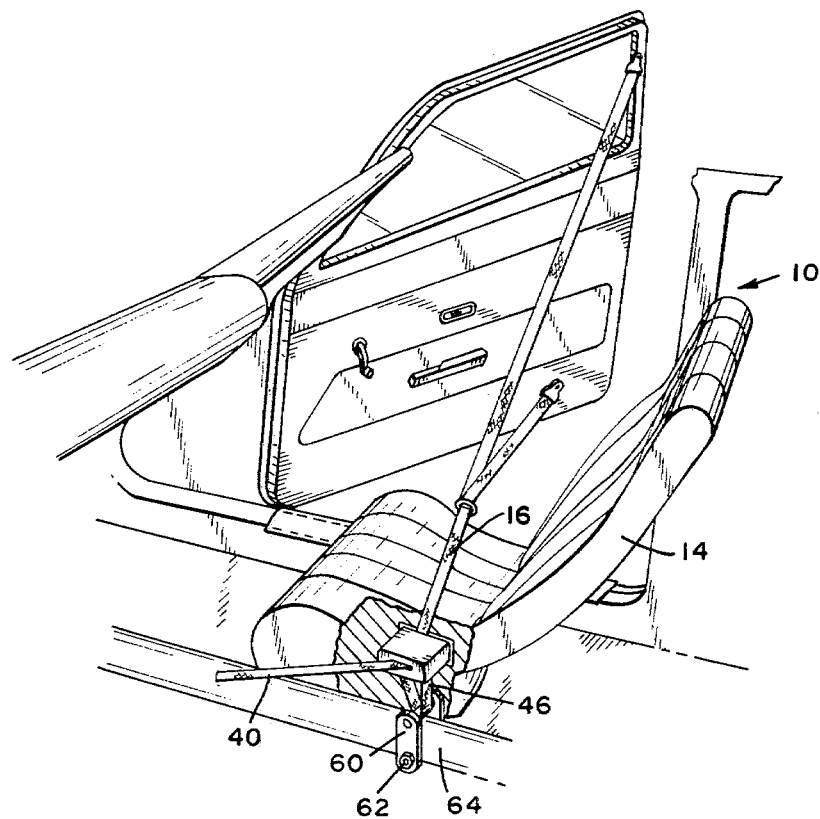
FIG. 1 is a perspective view of one embodiment of the seat belt restraint system of this invention wherein a passive seat belt system is shown.
Figure 2:
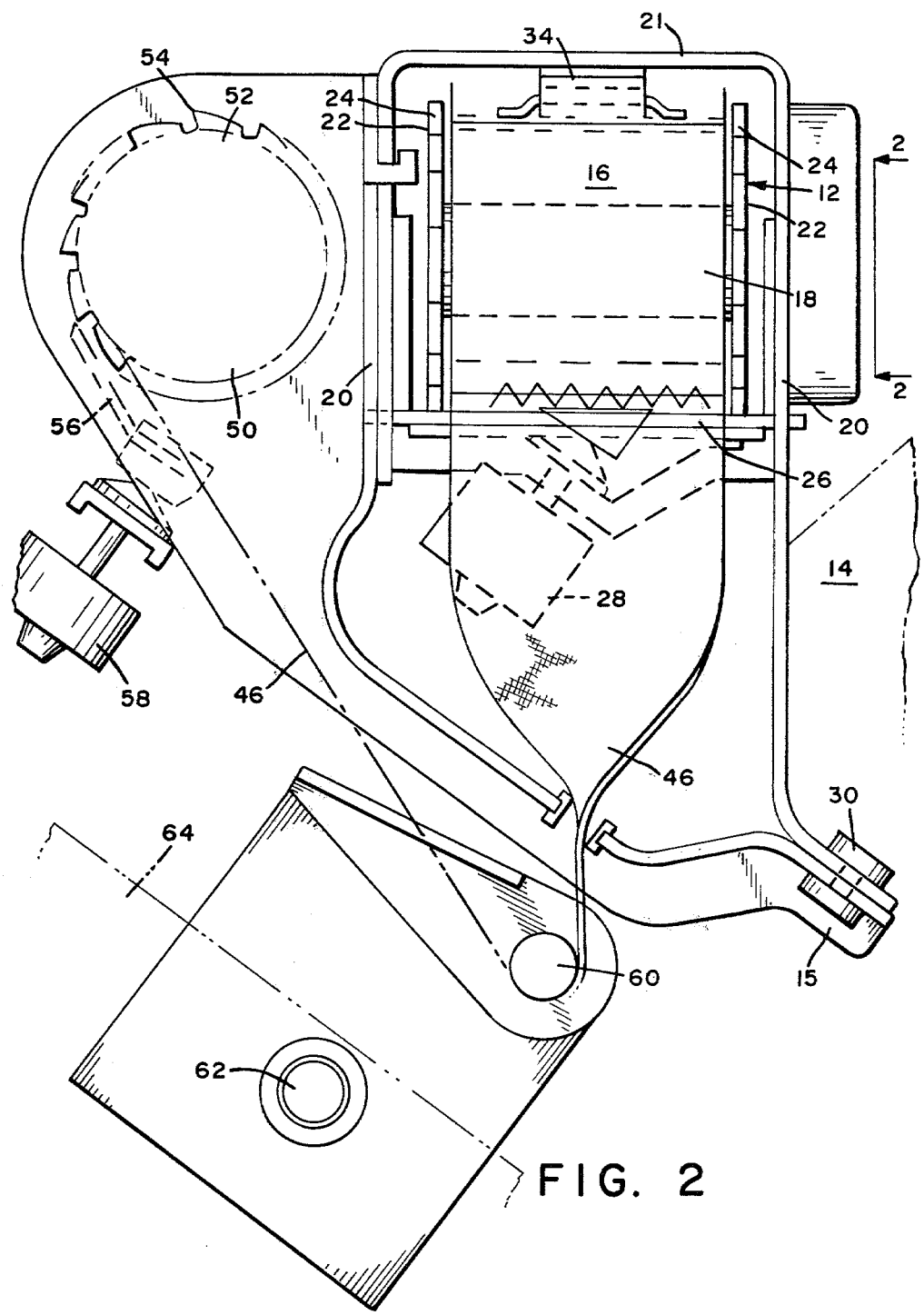
FIG. 2 is a side view of the seat belt retractors of FIG. 1.
Figure 3:
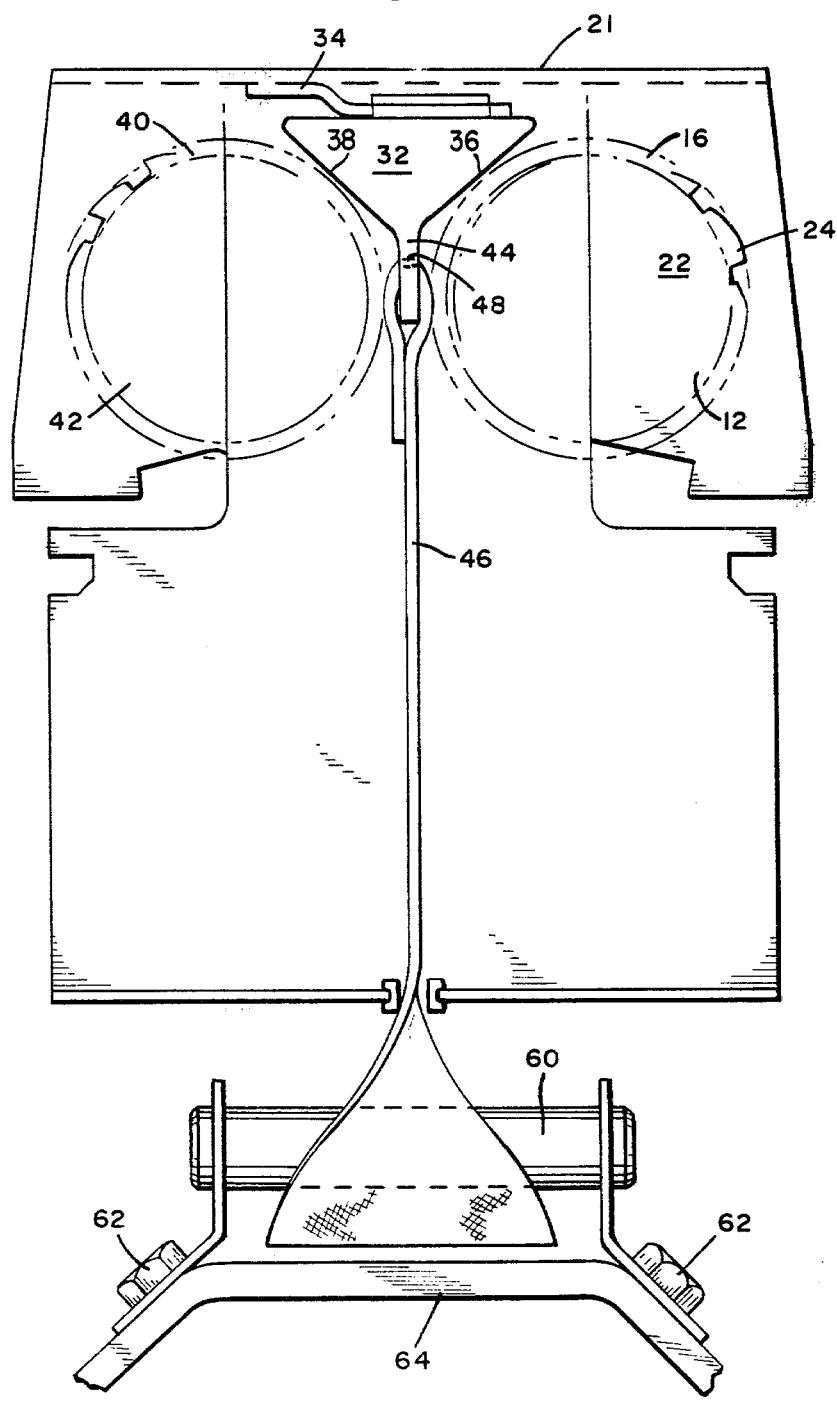
FIG. 3 is a cross-sectional view along line 2—2 of FIG. 2.

With reference to FIGS. 1-3, there is shown a seat belt system 10 including a retractor 12 mounted on the side of the seat 14 in a vehicle. Retractor 12 has seat belt webbing 16 wrapped in convolutions about a spool 18 which is journalled between side flanges 20. One or more locking ratchet wheels 22 having ratchet teeth 24 along its periphery is mounted for rotation in retractor 12. A locking pawl 26 is engageable with ratchet teeth 24 upon the sensing of a deceleration or disorientation of the vehicle by a pendulum 28 operatively connected to pawl 26 in a well known manner.

In accordance with this invention, retractor 12 is mounted to the frame 15 of seat 14 by a shear pin 30 which is adapted to fail at a predetermined relatively low load on the retractor. A web clamp 32 is mounted to a connecting portion 21 of the frame of retractor 12 by a steel spring member 34. Clamp 32 includes a surface 36 for contact with webbing 16 on retractor 12. As shown, clamp 32 is in the form of a Y and has a second surface 38 for contact with webbing 40 stored on retractor 42 associated with a seating position adjacent to seat 14 for compactness, such as in a bench seat. It is to be understood, however, that a single clamping surface for clamping webbing associated with a single retractor may be employed. It is also to be understood that clamp 32 may be of any desired shape.

Secured to a leg 44 of clamp 32 is one end of webbing 46 which extends through opening 48 of leg 44 and is stitched or otherwise secured together. The other end of webbing 46 is attached to a retractor 50 which may be in the form of a conventional emergency locking seat belt retractor. As shown, retractor 50 includes a locking ratchet wheel 52 having teeth 54, a locking pawl 56 engageable with teeth 54, and an actuator in the form of a pendulum 58 for moving pawl 56 into engagement with teeth 54. Retractor 50 as shown is also mounted to the seat frame but alternatively may be mounted to a structural part of the vehicle, such as the floor or the transmission tunnel. Webbing 46 extends from retractor 50 and around U-shaped bracket 60 which is attached by via bolts 62 to the transmission tunnel 64 of the vehicle floor and then upwards to opening 48 in clamp leg 44. The other end of webbing 16 may be attached to an adjacent door in the vehicle to provide a passive seat belt system. However, as indicated above, the present invention also may be utilized in an active seat belt system in which the other end of webbing 16 would be attached to a tongue or buckle member.

In operation of the above described embodiment, during normal operating conditions in the vehicle webbing 16 and 40 may be fully extended from retractors 12 and 42, respectively, without contact with surfaces 36 and 38 of clamp 32 since clamp 32 is held away from retractors 12 and 42 by member 34. Thus, a relatively low friction seat belt system is provided. Seat 14 may be adjusted in a conventional manner via manual or power actuation along a track on the vehicle floor (not shown), which may also be tiltable. As seat 14 is moved along the vehicle floor, additional lengths of webbing 46 are extracted from retractor 50, which acts as a tether, so that clamp 32 moves along with retractors 12 and 42 on the vehicle seat 14. Thus, clamp 32 does not interfere with the normal adjusting movement of vehicle seat 14. In the event of a collision or similar occurrence, pendulum 28 moves pawl 26 into engagement with ratchet teeth 24 of retractor 12 due to deceleration of the vehicle and locks the shaft of retractor 12 from rotating in the extraction direction. Coincidentally, pendulum 58 also is actuated and moves pawl 56 into locking engagement with teeth 54 to lock the tether retractor 50 against rotation in the extraction direction. Should the deceleration forces be severe enough for the occupant to impact against webbing 16, such force is transferred to and sensed by retractor 12 prior to any significant tightening up of webbing 16 on retractor 12. This initial relatively small load on retractor 12 is, however, sufficient to cause shear pin 30 to fail and to separate retractor 12 from frame 15. As a result, retractor 12 is moved forwardly relative to seat 14. Movement of clamp 32 forwardly of seat 14 is prevented by spring member 34, which elongates as the retractor frame moves in a forward direction. Retractor 12 thus moves towards clamp 32.

When retractor 12 moves towards clamp 32, its roll of webbing 16 is pressed into contact with clamp surface 36 and webbing 16 becomes pinched or squeezed on the roll. As a result, the convolutions of webbing are prevented from tightening up. With webbing 16 effectively clamped against tightening up or further extraction movement and with retractors 12 and 50 locked against further rotation in the extraction direction, additional forces imparted by the occupant during the impact against webbing 16 are effectively transferred through retractor 12 to clamp 32 and by leg 44 to webbing 46 of tether retractor 50 and then to bracket 60 since webbing 46 is wrapped around bracket 60. Such load is then transferred to the vehicle frame via bolts 62.

For example, shear pin 30 normally holding retractor 12 in place may be designed to yield at a predetermined force, e.g., about 100 pounds (45 kilograms), acting on the retractor by movement of the occupant against the webbing. The roll of webbing then moves into contact with clamp 32 and further forward motion of the occupant is arrested due to the clamping action. Additional forces of the occupant against the webbing are transferred to the vehicle frame. Clamping of webbing 40 on retractor 42 occurs in the same manner.

Figure 4:
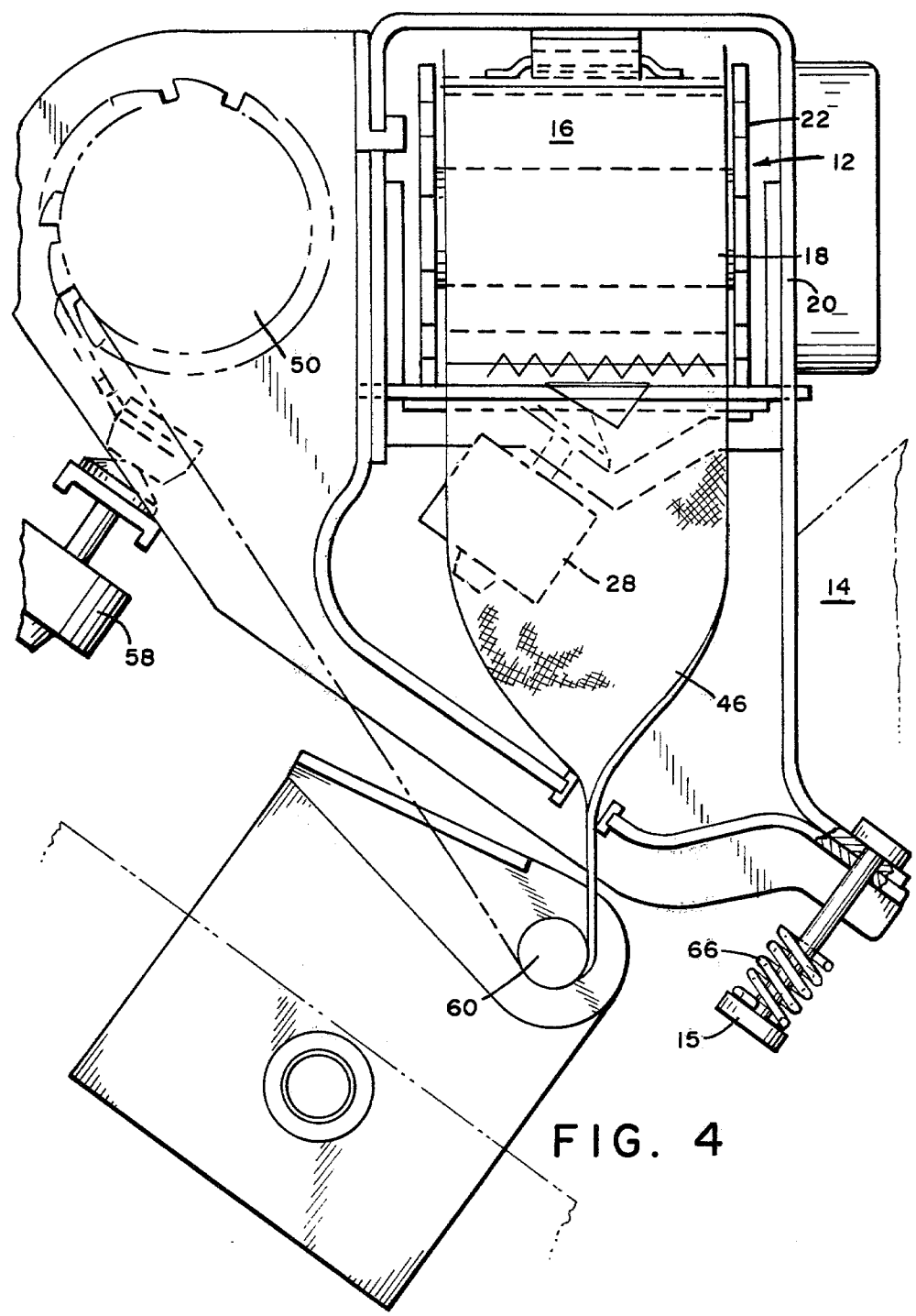
FIG. 4 is a side view similar to FIG. 3 of another embodiment of the retractor.

A second embodiment is shown in FIG. 4 wherein the frame housing retractors 12 and 42 is attached to seat frame 15 via spring 66 which normally maintains the retractors in a fixed position spaced from clamp 32. Upon transfer of initial load forces from the webbing to the retractor, the retractor moves forwardly against the bias of spring 66 towards clamp 32 whereby the roll of webbing is clamped as in the previous embodiment.

It should be noted that the embodiments disclosed above are only illustrative. For example, the retractors may be emergency locking retractors which are responsive to acceleration of the webbing or to both such acceleration and deceleration or disorientation of the vehicle. Further, retractors 12 and 42 may be mounted on other parts of the vehicle, such as on the seat track, floor, B-pillar, roof, etc. Also, for bucket seats, retractors 12 and 42 preferably are housed in separate frames attached to the seat, console, etc. Moreover, a releasable mounting means may be provided on the clamp, with the result that the clamp moves into contact with the spool of webbing.

It is to be understood that variations and modifications of the present invention may be made without departing from the scope thereof. It is also to be understood that the invention is not to be limited by the specific embodiments disclosed herein but only in accordance with the appended claims when read in light of the foregoing specification.

I claim:

1. A seat belt restraint system for installation in a vehicle, said system comprising:

seat belt retractor means adapted for mounting in said vehicle;

seat belt webbing stored in a roll on said retractor means and adapted to be extracted from and rewound onto said retractor means;

load transfer means for transferring forces acting on said retractor means to a load-bearing part of said vehicle;

locking means actuable to lock said retractor means in response to an emergency condition of said vehicle; and clamp means connected to said load transfer means and adapted for contact with said roll of webbing on said retractor means upon relative motion between said clamping means and said retractor means following actuation of said locking means, whereby extraction of said webbing from said retractor means is prevented and said forces acting on said retractor means are transferred to said structural part of said vehicle.

2. The seat belt system of claim 1 wherein said clamp means comprises an inclined surface adapted to contact said webbing on said retractor.

3. The seat belt system of claim 1 including a common frame for said retractor means and said clamp means, said clamp means being attached to said frame by a spring member, whereby said frame is displaceable with respect to said clamp means.

4. The seat belt system of claim 1 including means releasably attaching said retractor means to a part of said vehicle, said means permitting motion of said retractor means relative to said part of said vehicle in response to extension of said webbing resulting from movement by an occupant against said webbing subsequent to actuation of said locking means, whereby said retractor means moves into contact with said clamp means.

5. The seat belt system of claim 4 wherein said retractor means is releasably attached to a seat in said vehicle.

6. The seat belt system of claim 5 wherein said webbing is adapted to be automatically positioned about said occupant.

7. The seat belt system of claim 6 wherein said load transfer means comprises means permitting adjustment of the position of said clamp means in said vehicle together with adjustment of the position of said seat in said vehicle.

8. The seat belt system of claim 7 wherein said adjustment means comprises a second retractor means adapted for mounting in said vehicle, webbing having one end attached to said second retractor means and an opposite end attached to said clamp means, said webbing being stored on said second retractor means and adapted to be extracted from and rewound onto said second retractor means.

9. The seat belt system of claim 8 including second locking means for locking said second retractor means in response to said emergency condition.

10. The seat belt system of claim 9 including a third retractor means associated with an adjacent seating position in said vehicle, seat belt webbing stored on said third retractor means and adapted to be extracted from and rewound onto said third retractor means, said third retractor means also being movable into contact with said clamp means.

11. The seat belt system of claim 1 including means releasably attaching said retractor means to a part of said vehicle.

12. The seat belt system of claim 1 wherein said webbing is adapted to be automatically positioned about an occupant in a seat in said vehicle.

13. The seat belt system of claim 1 wherein said load transfer means includes means permitting adjustment of the position said clamp means in said vehicle together with adjustment of the position of a seat in said vehicle.

14. The seat belt system of claim 13 wherein said adjustment means comprises retracting means.

15. The seat belt system of claim 1 including a second seat belt retractor means adapted for mounting adjacent to said seat belt retractor means in said vehicle and seat belt webbing stored on said second retractor means, said clamp means also being adapted for contact with said webbing on said second retractor means.

16. The seat belt system of claim 15 wherein said clamp means comprises a pair of inclined surfaces adapted to respectively engage said webbing on both said retractors.

17. The seat belt system of claim 16 wherein said clamp means has a substantially Y-shape.

18. A seat belt restraint system for installation in a vehicle, said system comprising:

seat belt retractor means adapted for mounting said vehicle;

seat belt webbing stored on said retractor means in a roll and adapted to be extracted from and rewound onto said retractor means;

locking means operable to lock said retractor means against motion in a direction permitting extraction of said webbing; and clamp means operable to contact said roll of webbing on said retractor means to limit withdrawal of said webbing from said retractor means.

19. The seat belt retractor means of claim 18 wherein said roll of webbing is in the form of a plurality of convolutions of webbing and wherein said clamp means is operable to clamp said roll of webbing on said retractor means to limit relative movement between successive convolutions of webbing.

* * * * *